US011900470B1

(12) United States Patent
Devereaux et al.

(10) Patent No.: US 11,900,470 B1
(45) Date of Patent: *Feb. 13, 2024

(54) SYSTEMS AND METHODS FOR ACQUIRING INSURANCE RELATED INFORMATICS

(71) Applicant: United Services Automobile Association (USAA), San Antonio, TX (US)

(72) Inventors: Ramsey Devereaux, San Antonio, TX (US); Tearanie Kennedy, Schertz, TX (US); Michael J. Allen, San Antonio, TX (US); Spencer Read, Helotes, TX (US); Elizabeth J. Rubin, San Antonio, TX (US); Mark A. Zuwala, San Antonio, TX (US); Mark F. Davis, Boerne, TX (US); Kathleen L. Swain, Kemah, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 83 days.

This patent is subject to a terminal disclaimer.

(21) Appl. No.: 17/196,437

(22) Filed: Mar. 9, 2021

Related U.S. Application Data (63) Continuation of application No. 14/862,776, filed on Sep. 23, 2015, now Pat. No. 10,991,049.

(Continued)

(51) Int. Cl.
*G06Q 40/08* (2012.01)
*G06Q 50/16* (2012.01)
(Continued)

(52) U.S. Cl.
CPC .......... *G06Q 40/08* (2013.01); *G06Q 50/163* (2013.01); *G06T 7/73* (2017.01); *G06V 10/751* (2022.01);
(Continued)

(58) Field of Classification Search
CPC .................................................. G06Q 40/08
(Continued)

(56) References Cited

U.S. PATENT DOCUMENTS

| 4,453,155 A | 6/1984 | Cooper |
|---|---|---|
| 5,637,871 A | 6/1997 | Piety et al. |

(Continued)

FOREIGN PATENT DOCUMENTS

| CN | 204173418 | 2/2015 |
|---|---|---|
| KR | 20120081261 | 7/2012 |

(Continued)

OTHER PUBLICATIONS

Authors: Vidhya Tekken Valapi et al; Title: Towards Formalization of a Data Model for Operational Risk Assessment: IEEE Xplore; Date of Conference: Oct. 3-7, 2021 (Year: 2021).*

(Continued)

*Primary Examiner* — Bruce I Ebersman
*Assistant Examiner* — Hatem M Ali
(74) *Attorney, Agent, or Firm* — Fish & Richardson P.C.

(57) ABSTRACT

A first inspection of insured property is performed to detect hazardous conditions related to the insured property. This first inspection is performed using a first set of imagery data received from one or more imagery data sources. One or more preventive measures are recommended to address the detected hazardous conditions based on analysis of the first set of imagery data. A second inspection is performed using a second set of imagery data received from the imagery data sources. The second inspection is performed to verify that recommended preventive measures have been taken. The first and second sets of imagery data may contain satellite and aerial imagery. The imagery data sources may provide (Continued)

information such as an image of an insured property's roof, an image of a terrain surrounding the insured property, or any other aerial images.

20 Claims, 5 Drawing Sheets

Related U.S. Application Data (60) Provisional application No. 62/054,191, filed on Sep. 23, 2014.

(51) Int. Cl.
| | |
|---|---|
| *G06V 10/75* | (2022.01) |
| *G06V 20/10* | (2022.01) |
| *G06T 7/73* | (2017.01) |
| *G06V 30/19* | (2022.01) |

(52) U.S. Cl.
CPC ...... *G06V 20/188* (2022.01); *G06V 30/19013* (2022.01); *G06T 2207/10004* (2013.01); *G06T 2210/64* (2013.01)

(58) Field of Classification Search
USPC .......................................................... 705/4
See application file for complete search history.

(56) References Cited

U.S. PATENT DOCUMENTS

| | | | |
|---|---|---|---|
| 5,724,261 A | 3/1998 | Denny | |
| 6,526,807 B1 | 3/2003 | Doumit et al. | |
| 6,766,322 B1 | 7/2004 | Bell | |
| 6,826,607 B1 | 11/2004 | Gelvin et al. | |
| 7,398,218 B1 | 7/2008 | Bernaski et al. | |
| 7,406,436 B1 | 7/2008 | Reisman | |
| 7,610,210 B2 | 10/2009 | Helitzer et al. | |
| 7,711,584 B2 | 5/2010 | Helitzer et al. | |
| 7,716,076 B1 | 5/2010 | Block et al. | |
| 7,809,587 B2 | 10/2010 | Dorai et al. | |
| 7,949,548 B2 | 5/2011 | Mathai et al. | |
| 8,004,404 B2 | 8/2011 | Izumi et al. | |
| 8,041,636 B1 | 10/2011 | Hunter et al. | |
| 8,086,523 B1 | 12/2011 | Palmer | |
| 8,106,769 B1 | 1/2012 | Maroney | |
| 8,196,516 B2 | 6/2012 | Beselt | |
| 8,229,767 B2 | 7/2012 | Birchall | |
| 8,271,303 B2 | 9/2012 | Helitzer | |
| 8,271,321 B1 | 9/2012 | Kastenbaum | |
| 8,289,160 B1 | 10/2012 | Billman | |
| 8,332,242 B1 | 12/2012 | Medina | |
| 8,400,299 B1 | 3/2013 | Maroney et al. | |
| 8,428,972 B1 | 4/2013 | Noles et al. | |
| 8,650,048 B1 | 2/2014 | Hopkins, III et al. | |
| 8,676,612 B2 | 3/2014 | Helitzer | |
| 8,719,061 B2 | 5/2014 | Birchall | |
| 8,731,975 B2 | 5/2014 | English et al. | |
| 8,760,285 B2 * | 6/2014 | Billman .................. | G06Q 40/08 340/539.11 |
| 8,774,525 B2 | 7/2014 | Pershing | |
| 8,788,299 B1 | 7/2014 | Medina | |
| 8,788,301 B1 | 7/2014 | Marlow | |
| 8,791,417 B2 | 7/2014 | Scelzi et al. | |
| 8,872,818 B2 | 10/2014 | Freeman | |
| 9,082,015 B2 | 7/2015 | Christopulos | |
| 9,141,995 B1 | 9/2015 | Brinkmann | |
| 9,164,002 B2 | 10/2015 | Anderson | |
| 9,183,560 B2 | 11/2015 | Abelow | |
| 9,252,980 B2 | 2/2016 | Raman | |
| 9,454,907 B2 | 9/2016 | Hafeez | |
| 9,481,459 B2 | 11/2016 | Staskevich | |
| 9,611,038 B2 | 4/2017 | Dahlstrom | |
| 9,754,325 B1 | 9/2017 | Konrardy | |
| 9,811,862 B1 | 11/2017 | Allen | |
| 9,842,310 B2 | 12/2017 | Lekas | |
| 9,892,463 B1 | 2/2018 | Hakinni-Boushehri | |
| 9,984,417 B1 | 5/2018 | Allen | |
| 10,158,842 B2 | 12/2018 | McCloskey et al. | |
| 10,475,239 B1 * | 11/2019 | Priest .................... | G03B 35/02 |
| 2002/0032586 A1 | 3/2002 | Joao | |
| 2002/0087364 A1 | 7/2002 | Lerner | |
| 2002/0096638 A1 | 7/2002 | Toomey | |
| 2002/0103622 A1 | 8/2002 | Burge | |
| 2002/0178033 A1 | 11/2002 | Yoshioka | |
| 2003/0040934 A1 | 2/2003 | Skidmore | |
| 2003/0097335 A1 | 5/2003 | Moskowitz et al. | |
| 2004/0039586 A1 | 2/2004 | Garvey et al. | |
| 2004/0064345 A1 | 4/2004 | Ajamian et al. | |
| 2004/0124359 A1 | 7/2004 | Hamerlius et al. | |
| 2004/0172304 A1 | 9/2004 | Joao | |
| 2005/0018745 A1 | 1/2005 | Lee | |
| 2005/0050017 A1 | 3/2005 | Ross et al. | |
| 2005/0055248 A1 | 3/2005 | Helitzer et al. | |
| 2005/0197847 A1 | 9/2005 | Smith | |
| 2005/0262923 A1 | 12/2005 | Kates | |
| 2006/0026044 A1 | 2/2006 | Smith | |
| 2006/0028345 A1 | 2/2006 | Lee | |
| 2006/0218018 A1 | 9/2006 | Schmitt | |
| 2006/0232675 A1 | 10/2006 | Chamberlain et al. | |
| 2006/0235611 A1 | 10/2006 | Deaton | |
| 2007/0005400 A1 | 1/2007 | Eggenberger | |
| 2007/0005404 A1 | 1/2007 | Raz et al. | |
| 2007/0043803 A1 | 2/2007 | Whitehouse et al. | |
| 2007/0070198 A1 | 3/2007 | Vera et al. | |
| 2007/0072541 A1 | 3/2007 | Daniels, II | |
| 2007/0088579 A1 | 4/2007 | Richards, Jr. | |
| 2007/0118399 A1 | 5/2007 | Avinash et al. | |
| 2007/0156463 A1 | 7/2007 | Burton | |
| 2007/0174467 A1 | 7/2007 | Ballou et al. | |
| 2008/0018138 A1 | 1/2008 | Vance | |
| 2008/0033847 A1 | 2/2008 | McIntosh | |
| 2008/0052134 A1 | 2/2008 | Nowak et al. | |
| 2008/0065427 A1 | 3/2008 | Helitzer et al. | |
| 2008/0086320 A1 | 4/2008 | Ballew et al. | |
| 2008/0114655 A1 | 5/2008 | Skidmore | |
| 2008/0141595 A1 | 6/2008 | Lawler | |
| 2008/0154651 A1 | 6/2008 | Keneflick et al. | |
| 2008/0154686 A1 | 6/2008 | Vicino | |
| 2008/0159616 A1 | 7/2008 | Fellinger | |
| 2008/0164769 A1 | 7/2008 | Eck | |
| 2008/0244329 A1 | 10/2008 | Shinbo | |
| 2008/0265162 A1 | 10/2008 | Hamerlius et al. | |
| 2008/0282817 A1 | 11/2008 | Breed | |
| 2008/0306799 A1 | 12/2008 | Sopko, III | |
| 2009/0006175 A1 | 1/2009 | Maertz | |
| 2009/0109037 A1 | 4/2009 | Farmer | |
| 2009/0177302 A1 | 7/2009 | Kondo | |
| 2009/0177500 A1 | 7/2009 | Swahn | |
| 2009/0182528 A1 | 7/2009 | De Groot | |
| 2009/0188202 A1 | 7/2009 | Vokey | |
| 2009/0205054 A1 | 8/2009 | Blotenberg | |
| 2009/0265193 A1 | 10/2009 | Collins et al. | |
| 2009/0265207 A1 | 10/2009 | Johnson | |
| 2009/0266565 A1 | 10/2009 | Char | |
| 2009/0279734 A1 | 11/2009 | Brown | |
| 2010/0131307 A1 | 5/2010 | Collopy et al. | |
| 2010/0174566 A1 | 7/2010 | Helizter et al. | |
| 2010/0241464 A1 | 9/2010 | Amigo | |
| 2010/0274859 A1 | 10/2010 | Bucuk | |
| 2011/0137684 A1 | 6/2011 | Peak et al. | |
| 2011/0137685 A1 | 6/2011 | Tracy et al. | |
| 2011/0161117 A1 | 6/2011 | Busque et al. | |
| 2011/0295624 A1 | 12/2011 | Chapin et al. | |
| 2011/0320226 A1 | 12/2011 | Graziano | |
| 2012/0016695 A1 | 1/2012 | Bernard | |
| 2012/0028635 A1 | 2/2012 | Borg et al. | |
| 2012/0101855 A1 | 4/2012 | Collins | |
| 2012/0116820 A1 | 5/2012 | English et al. | |
| 2012/0158436 A1 | 6/2012 | Bauer et al. | |
| 2012/0176237 A1 | 7/2012 | Tabe | |
| 2012/0290333 A1 | 11/2012 | Birchall | |
| 2013/0040636 A1 | 2/2013 | Borg et al. | |
| 2013/0060583 A1 | 3/2013 | Collins | |

(56) References Cited

U.S. PATENT DOCUMENTS

| | | | |
|---|---|---|---|
| 2013/0073303 | A1 | 3/2013 | Hsu |
| 2013/0144658 | A1 | 6/2013 | Schnabolk |
| 2013/0226624 | A1 | 8/2013 | Blessman et al. |
| 2013/0231779 | A1* | 9/2013 | Purkayastha ........ G05D 1/0088 700/258 |
| 2013/0245796 | A1 | 9/2013 | Lentzitzky |
| 2013/0317732 | A1 | 11/2013 | Borg et al. |
| 2013/0342653 | A1 | 12/2013 | McCloskey |
| 2014/0046701 | A1 | 2/2014 | Steinberg et al. |
| 2014/0108275 | A1 | 4/2014 | Heptonstall |
| 2014/0112229 | A1* | 4/2014 | Merlin .................. H04L 5/0055 370/311 |
| 2014/0114693 | A1 | 4/2014 | Helitzer et al. |
| 2014/0132409 | A1 | 5/2014 | Billman et al. |
| 2014/0136242 | A1 | 5/2014 | Weekes et al. |
| 2014/0142989 | A1 | 5/2014 | Grosso |
| 2014/0180723 | A1 | 6/2014 | Cote |
| 2014/0195272 | A1 | 7/2014 | Sadiq |
| 2014/0201315 | A1 | 7/2014 | Jacob |
| 2014/0241614 | A1 | 8/2014 | Lee |
| 2014/0257862 | A1 | 9/2014 | Billman |
| 2014/0257863 | A1 | 9/2014 | Maastricht |
| 2014/0270492 | A1 | 9/2014 | Christopulos |
| 2014/0278573 | A1 | 9/2014 | Cook |
| 2014/0316614 | A1 | 10/2014 | Newman |
| 2014/0322676 | A1 | 10/2014 | Raman |
| 2014/0358592 | A1 | 12/2014 | Wedig et al. |
| 2014/0380264 | A1 | 12/2014 | Misra |
| 2015/0006206 | A1 | 1/2015 | Mdeway |
| 2015/0019266 | A1 | 1/2015 | Stennpora |
| 2015/0221051 | A1 | 8/2015 | Settino |
| 2015/0372832 | A1 | 12/2015 | Kortz |
| 2016/0005130 | A1 | 1/2016 | Devereaux et al. |
| 2016/0104250 | A1 | 4/2016 | Allen et al. |
| 2016/0110622 | A1 | 4/2016 | Herring |
| 2016/0163186 | A1 | 6/2016 | Davidson |
| 2016/0239921 | A1 | 6/2016 | Bray |
| 2016/0295208 | A1 | 10/2016 | Beall |
| 2017/0178424 | A1 | 6/2017 | Wright |

FOREIGN PATENT DOCUMENTS

| | | | |
|---|---|---|---|
| WO | WO 2013/036677 | 3/2013 | |
| WO | WO-2017020465 A1 * | 2/2017 | ............. G01C 21/32 |

OTHER PUBLICATIONS

Authors et al: James Morgan; Title: Age Group Differences in Household Accident Risk Perceptions and Intentions to Reduce Hazards; Int J Environ Res Public Health. Jun. 2019; 16(12): 2237. (Year: 2019).*
Khan, "Assessment of Effective R-Value of Building Envelope Using High Definition Thermal Imaging Technique," King Fahd University of Petroleum & Minerals, May 2011, pp. 1-143, 154 pages.
U.S. Appl. No. 61/800,561, filed Mar. 15, 2013, Sanidas et al.
U.S. Appl. No. 61/866,779, filed Aug. 16, 2013, Bergner.
U.S. Appl. No. 61/926,091, filed Jan. 10, 2014, Allen et al.
U.S. Appl. No. 61/926,093, filed Jan. 10, 2014, Allen et al.
U.S. Appl. No. 61/926,095, filed Jan. 10, 2014, Allen et al.
U.S. Appl. No. 61/926,098, filed Jan. 10, 2014, Allen et al.
U.S. Appl. No. 61/926,103, filed Jan. 10, 2014, Devereaux et al.
U.S. Appl. No. 61/926,108, filed Jan. 10, 2014, Allen et al.
U.S. Appl. No. 61/926,111, filed Jan. 10, 2014, Allen et al.
U.S. Appl. No. 61/926,114, filed Jan. 10, 2014, Devereaux et al.
U.S. Appl. No. 61/926,118, filed Jan. 10, 2014, Devereaux et al.
U.S. Appl. No. 61/926,119, filed Jan. 10, 2014, Devereaux et al.
U.S. Appl. No. 61/926,121, filed Jan. 10, 2014, Devereaux et al.
U.S. Appl. No. 61/926,123, filed Jan. 10, 2014, Devereaux et al.
U.S. Appl. No. 61/926,532, filed Jan. 13, 2014, Allen et al.
U.S. Appl. No. 61/926,534, filed Jan. 13, 2014, Allen et al.
U.S. Appl. No. 61/926,536, filed Jan. 13, 2014, Allen et al.
U.S. Appl. No. 61/926,541, filed Jan. 13, 2014, Allen et al.
U.S. Appl. No. 61/943,897, filed Feb. 24, 2014, Devereaux et al.
U.S. Appl. No. 61/943,901, filed Feb. 24, 2014, Devereaux et al.
U.S. Appl. No. 61/943,906, filed Feb. 24, 2014, Devereaux et al.
U.S. Appl. No. 61/948,192, filed Mar. 5, 2014, Davis et al.
U.S. Appl. No. 62/311,491, filed Mar. 22, 2016, Moy.
U.S. Appl. No. 62/325,250, filed Apr. 20, 2016, Rodgers et al.
U.S. Appl. No. 62/351,427, filed Jun. 17, 2016, Devereaux et al.
U.S. Appl. No. 62/351,441, filed Jun. 17, 2016, Flachsbart et al.
U.S. Appl. No. 62/351,451, filed Jun. 17, 2016, Chavez et al.
Telematics Set the Stage the Improved Auto Claims Management by Sam Friedman (Oct. 10, 2012); 3 pages.
Zevnik, Richard. The Complete Book of Insurance. Sphinx. 2004. pp. 76-78.
Farmers Next Generation Homeowners Policy, Missouri, by Farmers insurance Exchange; 2008; 50 pages.
Gonzalez Ribeiro, Ana, "Surprising things your home insurance covers," Jan. 12, 2012 in Insurance; 4 pages.
Bue, "Automated Labeling of Materials in Hyperspectral Imagery," Nov. 2010, IEEE Transactions on Geoscience and Remote Sensing, 48(11):4059-70.
U.S. Appl. No. 14/251,377, filed Apr. 11, 2014, Devereaux et al.
U.S. Appl. No. 14/251,392, filed Apr. 11, 2014, Allen et al.
U.S. Appl. No. 14/251,404, filed Apr. 11, 2014, Devereaux et al.
U.S. Appl. No. 14/251,411, filed Apr. 11, 2014, Allen et al.
U.S. Appl. No. 14/273,877, filed May 9, 2014, Allen et al.
U.S. Appl. No. 14/273,889, filed May 9, 2014, Devereaux et al.
U.S. Appl. No. 14/273,918, filed May 9, 2014, Allen et al.
U.S. Appl. No. 14/278,182, filed May 15, 2014, Allen et al.
U.S. Appl. No. 14/278,202, filed May 15, 2014, Allen et al.
U.S. Appl. No. 14/303,336, filed Jun. 12, 2014, Devereaux et al.
U.S. Appl. No. 14/303,347, filed Jun. 12, 2014, Devereaux et al.
U.S. Appl. No. 14/303,370, filed Jun. 12, 2014, Allen et al.
U.S. Appl. No. 14/303,382, filed Jun. 12, 2014, Allen et al.
U.S. Appl. No. 14/305,732, filed Jun. 16, 2014, Devereaux et al.
U.S. Appl. No. 14/324,534, filed Jul. 7, 2014, Devereaux et al.
U.S. Appl. No. 14/324,546, filed Jul. 7, 2014, Devereaux et al.
U.S. Appl. No. 14/324,609, filed Jul. 7, 2014, Devereaux et al.
U.S. Appl. No. 14/324,618, filed Jul. 7, 2014, Devereaux et al.
U.S. Appl. No. 14/324,748, filed Jul. 7, 2014, Devereaux et al.
U.S. Appl. No. 14/324,759, filed Jul. 7, 2014, Devereaux et al.
U.S. Appl. No. 14/494,207, filed Sep. 23, 2014, Campbell.
U.S. Appl. No. 14/572,413, filed Dec. 16, 2014, Devereaux et al.
U.S. Appl. No. 14/573,981, filed Dec. 15, 2014, Allen et al.
U.S. Appl. No. 14/862,776, filed Sep. 23, 2015, Devereaux et al.
U.S. Appl. No. 14/941,225, filed Nov. 13, 2015, Billman et al.
U.S. Appl. No. 14/941,262, filed Nov. 13, 2015, Hopkins et al.
U.S. Appl. No. 15/244,847, filed Aug. 23, 2016, Devereaux et al.
U.S. Appl. No. 15/365,555, filed Nov. 30, 2016, Devereaux et al.
U.S. Appl. No. 15/365,611, filed Nov. 30, 2016, Devereaux et al.
U.S. Appl. No. 15/365,676, filed Nov. 30, 2016, Devereaux et al.
U.S. Appl. No. 15/365,706, filed Nov. 30, 2016, Devereaux et al.
U.S. Appl. No. 15/365,721, filed Nov. 30, 2016, Devereaux et al.
U.S. Appl. No. 15/365,725, filed Nov. 30, 2016, Devereaux et al.
U.S. Appl. No. 15/365,736, filed Nov. 30, 2016, Devereaux et al.
U.S. Appl. No. 15/365,745, filed Nov. 30, 2016, Devereaux et al.
U.S. Appl. No. 15/365,754, filed Nov. 30, 2016, Devereaux et al.
U.S. Appl. No. 15/365,764, filed Nov. 30, 2016, Devereaux et al.
U.S. Appl. No. 15/365,773, filed Nov. 30, 2016, Devereaux et al.
U.S. Appl. No. 15/365,786, filed Nov. 30, 2016, Devereaux et al.
U.S. Appl. No. 15/165,854, filed May 26, 2016, Matheson.
U.S. Appl. No. 16/668,912, filed Oct. 30, 2019, Matheson.
U.S. Appl. No. 17/158,343, filed Jan. 26, 2021, Matheson.

* cited by examiner

SYSTEMS AND METHODS FOR ACQUIRING INSURANCE RELATED INFORMATICS

CROSS REFERENCE TO RELATED APPLICATIONS

This application is a continuation application of and claims priority under 35 U.S.C. § 120 to U.S. application Ser. No. 14/862,776, filed on Sep. 23, 2015, which claims priority to U.S. Patent Application Ser. No. 62/054,191, filed Sep. 23, 2014, the entire contents of each of which are incorporated herein by reference.

FIELD OF THE INVENTION

The disclosed embodiments generally relate to a method and computerized system for creating, publishing, underwriting, adjusting claims, selling and managing insurance and related products and services, and more particularly, to aggregating and utilizing data captured from an insured property for creating, publishing, underwriting, adjusting claims, selling and managing insurance and related products and services as well as obtaining relevant information and facilitating certain actions.

BACKGROUND OF THE INVENTION

Smart house functionality is a maturing space, but the opportunity for insurance companies remains largely untapped. Currently, there are few useful early warning and loss mitigation systems that actually save costs and time for both the homeowner and insurance company alike. For instance, currently, homeowners insurance claim events are detected by the homeowner, and they contact their insurance company to inform them that there has been a loss. However, further loss could be mitigated with automated warning and detection systems that interface with the insurance company systems. For example, homeowners may often never become aware of minor to medium hail damage to their roofs until such time as that damage leads to further water damage. If they could be made aware of such loss events earlier and then take corrective actions, then the increased damage and loss could have been mitigated.

Another maturing space concerns satellite and aerial imagery from Unmanned Aerial Systems (UAS). As the number of satellites increases, the more satellite imagery is becoming available to the public. As a result, satellite imagery systems or image draped systems, such as, Google Earth, are becoming more popular. Using Google Earth, a user can view satellite imagery, 3D terrain, and Geographic Information Services (GIS) data such as roads and political boundaries which can be stored in a central database. Google Earth can also display information from other sources. Also as the world of commercial UAS develops, aerial imagery and mapping from unmanned aerial system will be readily available. The digital data collected through remote sensing from the unmanned aerial systems will be able to capture pre and post images of an insured property. Through artificial intelligence from the unmanned aerial system it would enable change detection to identify material composition and damages to the insured property.

In this regard, there is utility and functionality to be provided by aggregating smart home functionality with aerial imagery, satellite imagery, UAS imagery, sensor data and other insurance related data to facilitate rapid decision making process.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a first inspection of insured property is performed to detect hazardous conditions related to the insured property. This first inspection is performed using a first set of imagery and sensor data received from one or more imagery/sensor data sources. One or more preventive measures are recommended to address the detected hazardous conditions based on analysis of the first set of imagery and/or sensor data. A second inspection is performed using a second set of imagery and sensor data received from the imagery/sensor data sources. The second inspection is performed to verify that recommended preventive measures have been taken. The first and second sets of imagery and/or sensor data may contain satellite and aerial imagery. For example, the imagery and/or sensor data sources may provide information such as an image of an insured property's roof, an image of a terrain surrounding the insured property, or any other aerial images. Additional inspections may be necessary to continue to monitor the property. Therefore, the process may continue as needed beyond the first and second inspection to verify preventive measures have been completed, maintained, and/or if changes have occurred. Exemplary scenarios for such continuation include (but are not limited to): repairs were not able to be completed and will be delayed (e.g., weather, deployment, etc.); and provide the capability to continue to monitor vegetation (e.g., upkeep, new growth, etc.).

This summary section is provided to introduce a selection of concepts in a simplified form that are further described subsequently in the detailed description section. This summary section is not intended to identify key features or essential features of the claimed subject matter, nor is it intended to be used to limit the scope of the claimed subject matter.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an", and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety. For instance, commonly assigned U.S. Pat. Nos. 8,289,160 and 8,400,299 are related to certain embodiments described here and are each incorporated herein by reference in their entirety. This application additionally relates to U.S. patent application Ser. No. 13/670,328 filed Nov. 6, 2012, which claims continuation priority to U.S. patent application Ser. No. 12/404,554 filed Mar. 16, 2009 which are incorporated herein by reference in their entirety.

As used herein, the term "insurance" refers to a contract between an insurer, known as an insurance company, and an insured, also known as a policyholder, in which the insurer agrees to indemnify the insured for specified losses, costs, or damage on specified terms and conditions in exchange of a certain premium amount paid by the insured. In a typical situation, when the insured suffers some loss for which he/she may have insurance the insured makes an insurance claim to request payment for the loss. It is to be appreciated for the purpose of the embodiment illustrated herein, the insurance policy is not to be understood to be limited to a residential or homeowners insurance policy, but can be for a commercial, umbrella, and other insurance policies known to those skilled in the art.

As used herein, the term "insurance policy" may encompass a warranty or other contract for the repair, service, or maintenance of insured property.

As used herein, "insured property" means a dwelling, other buildings or structures, personal property, or business property, as well as the premises on which these are located, some or all which may be covered by an insurance policy.

Figure 1:
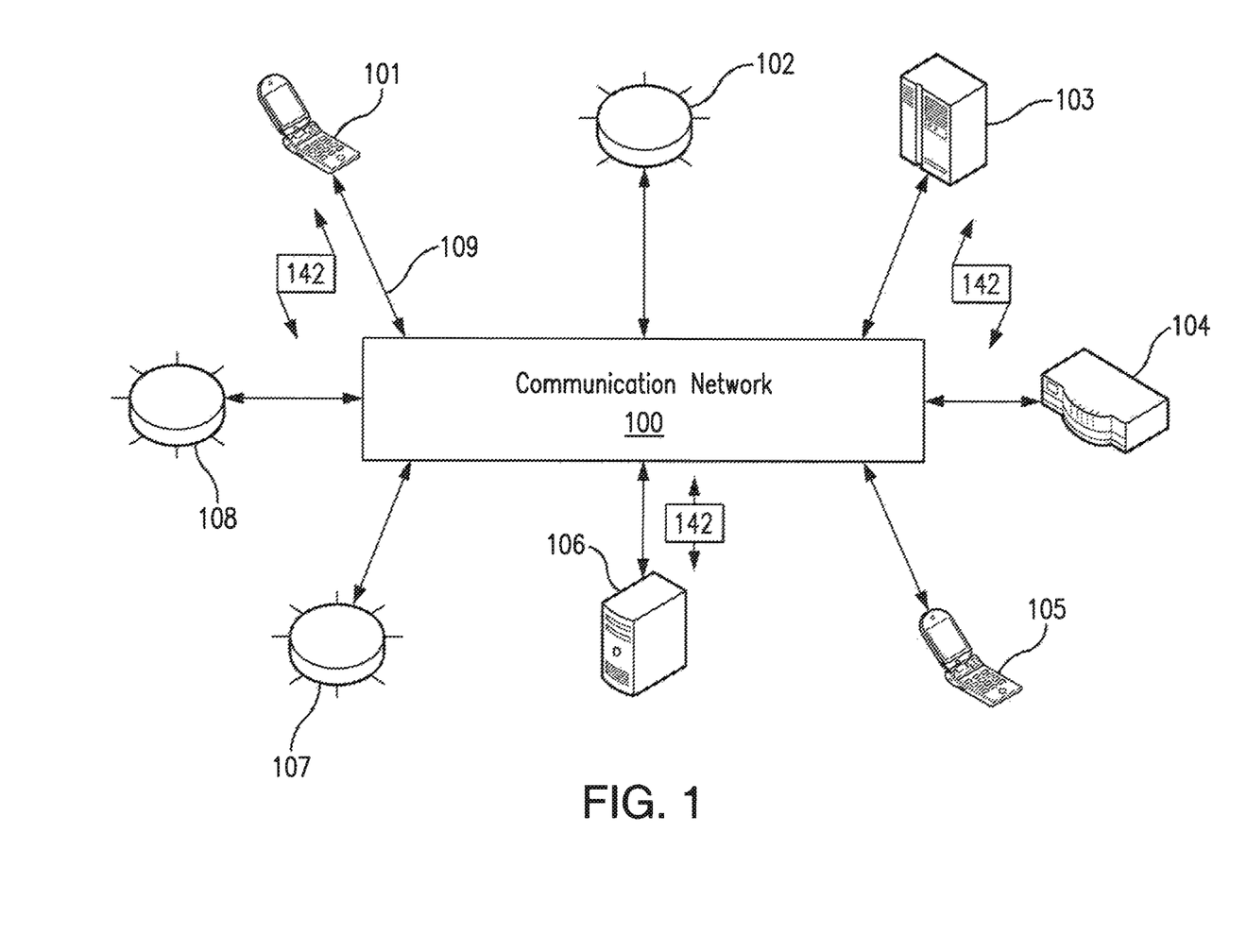
FIG. 1 illustrates an example communication network in accordance with an illustrated embodiment.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as insured property 300 (shown in FIG. 3). WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 101 and 105, servers 106, routers 107, switches 108 and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
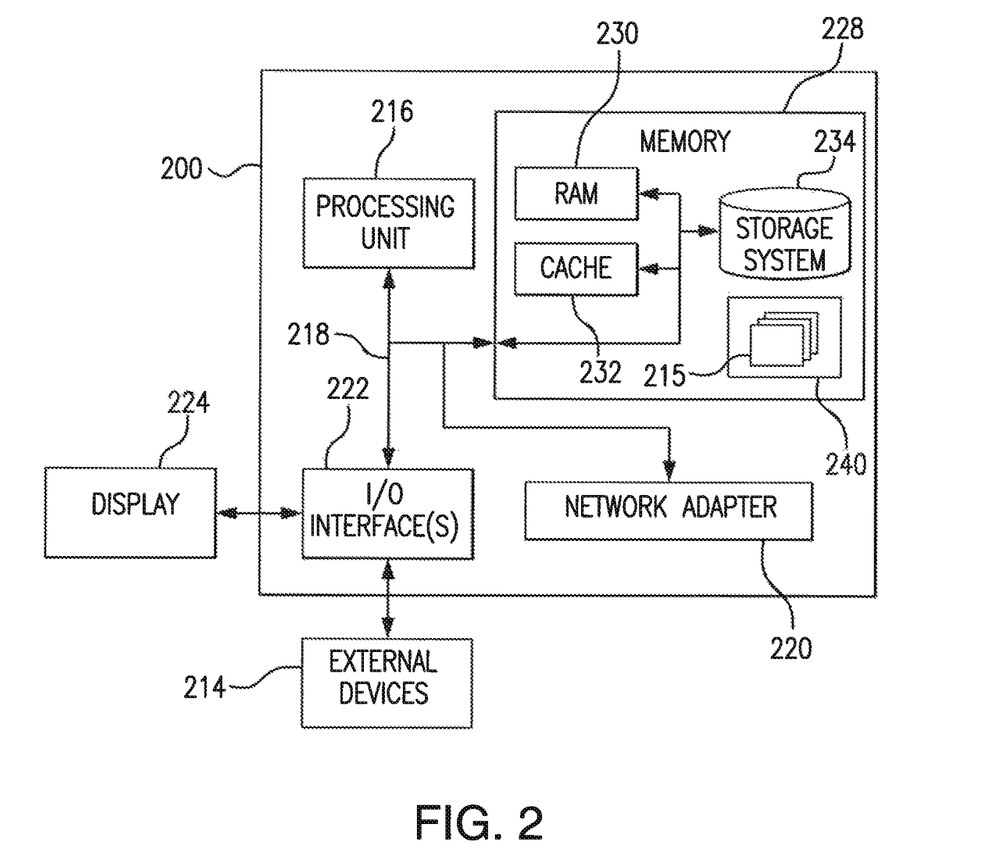
FIG. 2 illustrates a network computer device/node in accordance with an illustrated embodiment.

FIG. 2 is a schematic block diagram of an example network computing device 200 (e.g., one of network devices 101-108) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as policy manager module 306 and imagery data analyzer 308 described below, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
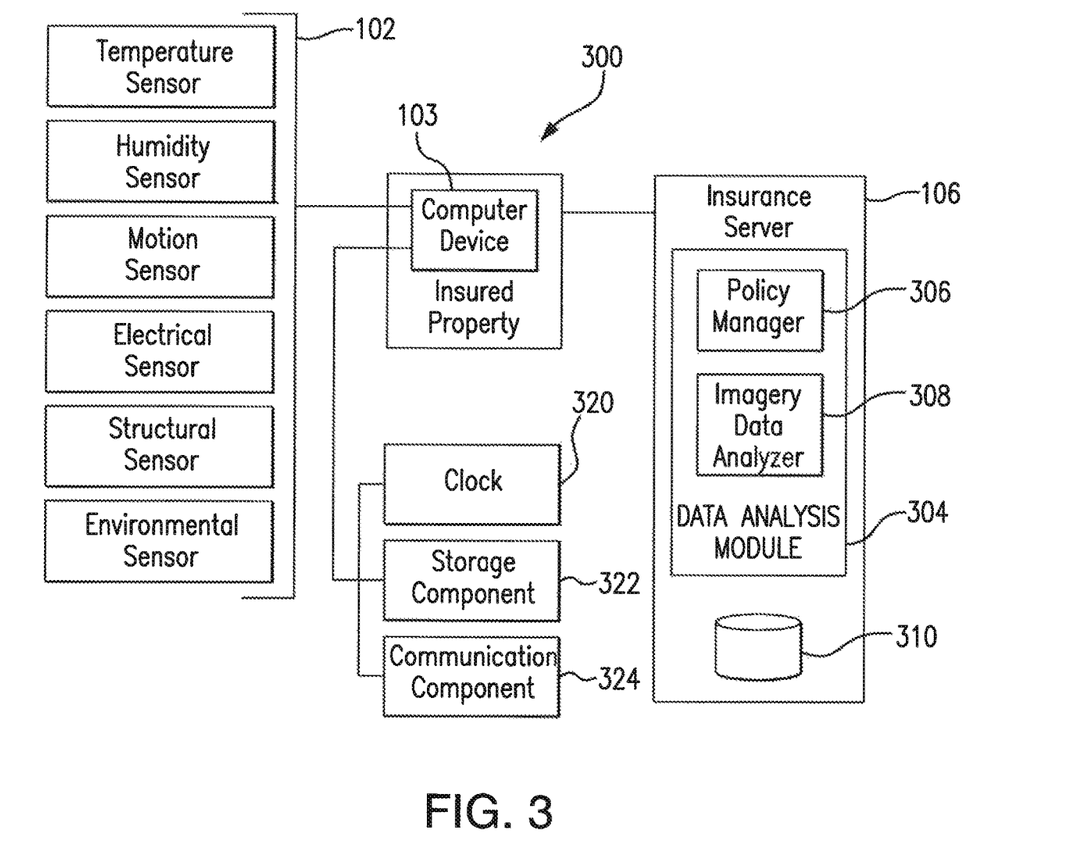
FIG. 3 is a block diagram of an insured property from which sensor and imagery data is captured for subsequent analysis in accordance with an illustrated embodiment.

With the exemplary communication network 100 (FIG. 1) and computing device 200 (FIG. 2) being generally shown and discussed above, description of certain illustrated embodiments of the present invention will now be provided. With reference now to FIG. 3, an example of an insured property 300 is shown which is to be understood to be any type of property (e.g., residential, commercial, retail, municipal, etc.) in which the capture, aggregation and analysis of various data is useful for the reasons at least described below. Insured property 300 preferably includes a computing device 103 for capturing data from a plurality of sensors 102 which capture data regarding various aspects of insured property 300, as further described below. It is to be understood computing device 103 may be located in any location, and its position is not limited to the example shown.

Computing device 103 is preferably configured and operational to receive (capture) data from various data sources, including various sensors 102 and various image data sources 402 (shown in FIG. 4), regarding certain aspects (including functional and operational) of insured property 300 (described further below) and transmit that captured data to a remote server 106, via network 100. It is noted device 103 may perform analytics regarding the captured sensor and imagery data regarding insured property 300 and/or the remote server 106, preferably controlled by an insurance company/carrier, may perform such analytics, as also further described below. It is also to be understood in other embodiments, data from sensors 102 and/or from image data sources 402 may be transmitted directly to remote server 106, via network 100, thus either obviating the need for insured property's computing device 103 or mitigating its functionality to capture all data from sensors 102 and image data sources 402.

In the illustrated embodiment of FIG. 3, computing device 103 is shown coupled to various below described sensor types 102. Although various sensor types 102 are described below and shown in FIG. 3, the sensor types described and shown herein are not intended to be exhaustive as embodiments of the present invention may encompass any type of known or unknown sensor type which facilitates the purposes and objectives of the certain illustrated embodiments described herein. Exemplary sensor types include (but are not limited to):

Temperature sensor—configured and operational to preferably detect the temperature present at the insured property 300. For example, the temperature may rise and fall with the change of seasons and/or the time of day. Moreover, in the event of a fire, the temperature present at the insured property 300 may rise quickly—possibly to a level of extreme high heat. The temperature sensor may make use of probes placed at various locations in and around the insured property 300, in order to collect a representative profile of the temperature present at the insured property 300. These probes may be connected to device 103 by wire, or by a wireless technology. For example, if device 103 is positioned in the attic of the insured property 300, the temperature may be higher than the general temperature present in the insured property. Thus, probes placed at various locations (e.g., in the basement, on the various levels of a multi-level insured property 300, in different rooms that receive different amounts of sun, etc.), in order to obtain an accurate picture of the temperature present at the insured property. Moreover, device 103 may record both the indoor and outdoor temperature present at the insured property 300. For example, data about the indoor temperature, the outdoor temperature, and/or the differential between indoor and outdoor temperatures, may be used as part of some analysis model, and thus all of the different values could be stored. Device 103 may store an abstract representation of temperature (e.g., the average indoor temperature, as collected at all of the probes), or may store each temperature reading individually so that the individual readings may be provided as input to an analysis model.

Humidity sensor—configured and operational to preferably detect the humidity present at the insured property 300. Humidity sensor may comprise the humidity-detection hardware, or may employ one or more remote probes, which may be located inside and/or outside the insured property 300. Humidity readings from one or more locations inside and/or outside the insured property could thus be recorded by device 103.

Water Sensor(s)/Water pressure sensor(s)—configured and operational to preferably monitor water related conditions, including (but not limited to): the detection of water and water pressure detection, for instance in the plumbing system in the insured property 300. With regards to a water pressure sensor, it may have one or more probes attached to various locations of the insured property's 300 plumbing, and thus device 103 may record the pressure present in the plumbing, and/or any changes in that pressure. For example, plumbing systems may be designed to withstand a certain amount of pressure, and if the pressure rises above that amount, the plumbing system may be at risk for leaking, bursting, or other failure. Thus, device 103 may record the water pressure (and water flow) that is present in the plumbing system at various points in time.

Leak detection sensor—configured and operational to preferably monitor the presence of leaks from gas and water plumbing pipes both inside and outside the walls of the insured property 300. The leak detection sensor may have one or more probes attached to various locations of the insured property's 300 plumbing and piping, and this device 103 may record the fact that there is a gas or water leak. An example of this is that a leak detection sensor can be placed behind the washing machine. If the hoses that connect the washing machine to the water line were to break the leak detection sensor would know that there was a water leak and notify the insured and/or the insurance company. The insured can also give prior authorization to the insurance company to act on their behalf to correct the water leak. An analysis model could use the information about how often the leak detection sensor alerts, whether the insured uses leak detection sensor(s), and where they are placed in various ways such as rating the home insurance, tracking water pressure, and/or providing advice and guidance.

Wind speed sensor—configured and operational to record the wind speed present at the insured property 300. For example, one or more wind sensors may be placed outside the insured property 300, at the wind speed and/or direction may be recorded at various points in time. Device 103 may record these wind speed and/or wind direction readings. The wind speed may be used by an analysis model to plan for future losses and/or to make underwriting decisions.

Motion sensor—configured and operational to sense motion in the insured property 300 to which sensor 102 is attached. Typically, insured property 300 does not move significantly, except in the event of a catastrophe. Motion sensor may indicate that the insured property 300 is sliding down a hill (e.g., in the event of an extreme flood or mudslide), or is experiencing a measurable earthquake. A motion sensor may further include earth sensors for detecting sink holes and earth movement. In addition, a motion sensor may be configured and operational to sense the motion of objects within the insured property 300.

Electrical system sensor/analyzer configured and operational to assess the condition of the insured property's 300 electrical system. For example, potentiometers may be connected to various points in the insured property's 300 electrical system to measure voltage. Readings from the potentiometers could be used to determine if the voltage is persistently too high, or too low, or if the voltage frequently drops and/or spikes. Such conditions may suggest that the insured property 300 is at risk for fire. Other types of electrical measurements could be taken, such as readings of current flowing through the electrical system. Any type of data about the insured property's 300 electrical system could be captured by device 103. An analysis model could use the information about electrical energy in various ways such as rating the home insurance, tracking energy consumption, or providing advice and guidance.

Positional sensor configured and operational to record the position of device 103. For example, the positional sensor may be, or may comprise, a Global Positioning System (GPS) receiver, which may allow the position of device 103 to be determined. Or, as another example, positional sensor may use triangulation technology that communicates with fixed points (such as wireless communication towers) to determine its position. While an insured property 300 normally does not move, positional sensor may allow device 103 to be recovered in the event of a catastrophe. For example, if an insured property 300 explodes, or is otherwise catastrophically damaged, device 103 may be propelled to an unknown location. Positional sensor may indicate the geographical area of an insured property 300 which an analysis model could use in various ways. Positional sensor may record the position of device 103, which device 103 could communicate to an external source, thereby allowing device 103 to be found.

Structural sensor—configured and operational to preferably detect various structural conditions relating to insured property 300. A structural sensor may comprise detection hardware, or may employ one or more remote probes, which may be located inside and/or outside the insured property 300. Conditions recorded by structural sensor may include (but are not limited to) the condition of the wall structure, floor structure, ceiling structure and roof structure of insured property 300, which may be achieved via: load bearing detectors; components which measure the slope of a floor/wall/ceiling; carpet conditions (e.g., via nano sensor) or any other components functional to detect such conditions. Structural readings from one or more locations inside and/or outside the insured property 300 could thus be recorded by device 103 and used by an analysis model in various ways.

Environmental Sensor—configured and operational to preferably detect various environmental conditions relating to insured property 300. An environmental sensor may comprise detection hardware, or may employ one or more remote probes, which may be located inside and/or outside the insured property 300. Conditions recorded by an environmental sensor may include (but are not limited to) the air quality present in insured property 300, the presence of mold/bacteria/algae/lead paint or any contaminant adverse to human health (whether airborne or attached to a portion of the structure of insured property 300). Such environmental readings from one or more locations inside and/or outside the insured property 300 could thus be recorded by device 103 and used by an analysis model in various ways.

With exemplary sensors 102 identified and briefly described above, and as will be further discussed below, it is to be generally understood sensors 102 preferably record certain data parameters relating to products and services provided by an insurance carrier, such as USAA, to facilitate rapid decision making process as described below. It is to be understood and appreciated the aforementioned sensors 102 may be configured as wired and wireless types integrated in a networked environment (e.g., WAN, LAN, WiFi, 802.11X, 3G, LTE, etc.), which may also have an associated IP address. It is to be further appreciated the sensors 102 may consist of internal sensors located within the structure of insured property 300; external sensors located external of the structure of insured property 300; sound sensors for detecting ambient noise (e.g., for detecting termite and rodent activity, glass breakage, intruders, etc.). It is additionally to be understood and appreciated that sensors 102 can be networked into a central computer hub (e.g., device 103) in an insured property to aggregate collected sensor data packets. Aggregated data packets can be analyzed in either insured property's computer system (e.g., device 103) or via an external computer environment (e.g., server 106). Additionally, it is to be understood data packets collected from sensors 102 can be aggregated in computing device 103 and sent as an aggregated packet to server 106 for subsequent analysis whereby data packets may be transmitted at prescribed time intervals (e.g., a benefit is to reduce cellular charges in that some insured properties 300 may not have Internet access or cellular service is backup when insured property's Internet service is nonfunctioning).

In accordance with an illustrated embodiment, in addition to the aforementioned, the sensors 102 being utilized relative to insured property 300, computing device 103 may additionally be coupled to a Clock 320 which may keep track of time for device 103, thereby allowing a given item of data to be associated with the time at which the data was captured. For example, device 103 may recurrently detect various environmental conditions relating to insured property 300, recurrently obtain captured images of various portions of the structure of insured property 300 or images of area surrounding the insured property 300, etc., and may timestamp each reading and each image. The time at which the readings are taken may be used to reconstruct events or for other analytic purposes, such as those described below. For example, the timestamps on roof images associated with the insured property 300 may be indicative of a roof condition at different moments in time.

A storage component 322 may further be provided and utilized to store data readings and/or timestamps in device 103. For example, storage component 322 may comprise, or may otherwise make use of, magnetic or optical disks, volatile random-access memory, non-volatile random—access memory or any other type of storage device. There may be sufficient data storage capacity to store several days or several weeks worth of readings.

A communication component 324 may further be provided and utilized to communicate recorded information from computing device 103 to an external location, such as computer server 106, which may be associated with an insurance carrier such as USAA. Communication component 324 may be, or may comprise, a network communication card such as an Ethernet card, a WiFi card, or any other communication mechanism. However, communication component 324 could take any form and is not limited to these examples. Communication component 324 might encrypt data that it communicates, in order to protect the security and/or privacy of the data. Communication component 324 may communicate data recorded by device 103 (e.g., data stored in storage component 322) to an external location, such as server 106. For example, server 106 may be operated by an insurance company, and may collect data from computing device 103 to learn about risks, verify that recommended preventive measures have been taken and perform other analytics related to insured property 300 in which device 103 is located. Communication component 324 may initiate communication sessions with server 106. Or, as another example, server 106 may contact device 103, through communication component 324, in order to receive data that has been stored by device 103. Additionally, data from sensors 102, other data sources 402 (shown in FIG. 4), clock 320 and/or storage component 322 may be communicated directly to server 106, via network 100, thus obviating or mitigating the need for computing device 103.

In the example of FIG. 3, communication component 324 (which is shown, in FIG. 3, as being part of, or used by, computing device 103) communicates data to server 106. Server 106 may comprise, or otherwise may cooperate with, a data analysis module 304, which may analyze data in some manner. Data analysis module 304 may comprise various types of sub-modules, such as policy manager 306 and imagery data analyzer 308. In one embodiment, imagery data analyzer 308 may perform an analysis of aggregated imagery data regarding various attributes of insured property 300, such as, for example, but not limited to, structural condition of the insured property 300, a type of vegetation and its proximity to the insured property 300 and environmental conditions detected in the vicinity of the insured property 300. In one embodiment, policy manager 306 may be configured and operable to streamline the end-to-end process (from quote to claim) of insuring users and/or to facilitate other processes related to an insurance profile of a policyholder associated with insured property 300. Server 106 may further comprise, or otherwise may cooperate with, a data repository 310, which may store captured informatics sensor data and obtained image information.

Figure 4:
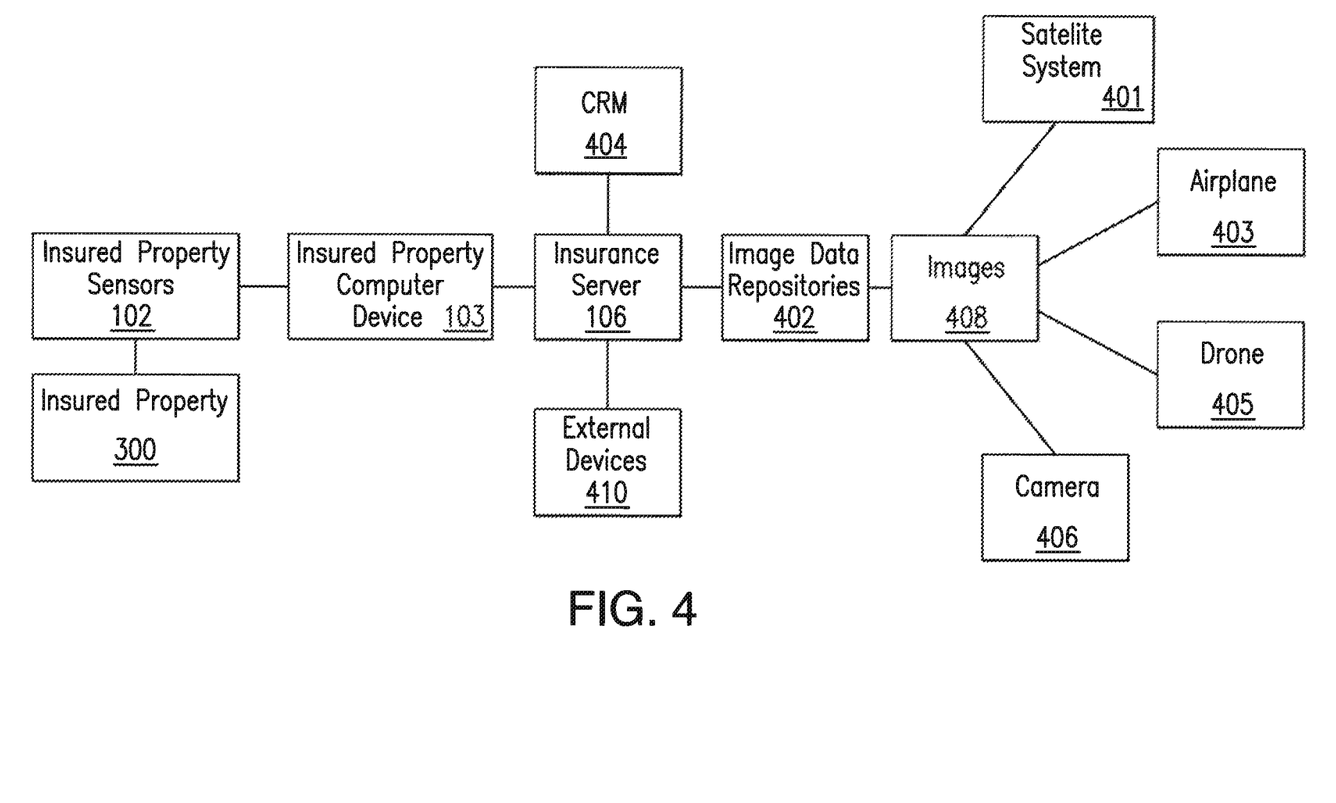
FIG. 4 is a system level diagram illustrating aggregation of data from a plurality of imagery data sources for verifying preventive measures were taken at the insured property in accordance with an illustrated embodiment.

With reference now to FIG. 4, shown is insurance server 106 coupled to computing device 103 for receiving data from sensors 102 preferably relating to insured property 300 in accordance with the above description. In addition to being coupled to computing device 103, insurance server 106 is also shown coupled to various image data repositories 402, external computing devices/servers 410 and an insurance company's Customer Relationship Management (CRM) tool/module 404. Network 100, and links 105 thereof (FIG. 1), preferably couple server 106 to each of the aforementioned components (e.g., computing device 103, CRM module 404, image data sources 402 and external computing devices 410).

With respect to image data repositories 402, they are preferably operatively coupled to one or more instruments (image data sources) for receiving image data/information 408 associated with the insured property 300. Modern techniques for locating one or more positions relative to objects of interest typically involve instruments that are used for surveying, geographical information systems data collection, or geospatial data collection. For example, Global Navigation Satellite System (GNSS) receivers are often used in conjunction with the surveying and geospatial instruments in order to speed position determination. Digital cameras 406, video cameras 406, multimedia devices, etc. may also be used for surveying purposes.

In various embodiments of the present invention, image data sources may include a flying object, such as an airplane 403, a helicopter, a satellite 401, and a drone 405 or any other flying object, device or vehicle. For any of these, the flying device is equipped with an imaging device or video inspection equipment (such as a video camera, still picture camera, etc.) and/or other sensors discussed herein needed to perform the desired inspection. Images from the imaging device can be used to assess the damage, perform change detection, and/or to verify that recommended preventive measures have been taken, without the need to send an inspector to the property location at all. In other embodiments, the imaging device (image data source) may be attached to a streetlight or other stable structure. Alternatively, other objects or structures capable of providing a view of the insured property 300, such as trees, telephone poles, flag poles, nearby structures/homes, or any other object or structure, can also be used for attaching an image data source. Also, the imaging device may be able to pivot and change focus via remote control. In other embodiments, the imaging device may be attached to a stand located directly on the roof or another part of the insured property 300. By placing the imaging device at one or more strategic locations on the property or roof, the roof can be completely inspected. Other sensors discussed herein can also be included and used to scan various parts of the insured property 300 at one or more locations if desired.

The confluence of these systems/devices produces a variety of image data 408 that may be contained in one or more image data repositories 402, such as an image-based georeferencing system, an image database, an image database management system, among others. According to an embodiment of the present invention, the image data repositories 402 may contain various views of the insured property 300, such as elevation views and aerial views. Elevation view in its strict definition means an orthographic rectified representation of a structure, such as insured property 300, usually as viewed from ground level. Camera images/photographs not yet rectified for orthographic presentation and not strictly elevation views, but instead are referred to herein as 'facade views.' Aerial views are images taken from above the objects of interest (i.e., insured property 300), often from airplanes 403, drones 405 or satellites 401, and themselves may be rectified or otherwise rendered to become orthographic. However, many image databases show them without such rectification, thus often showing the elevation/facades of buildings in a foreshortened view. It is appreciated that a plan view such as from a blueprint or engineering drawing also falls into the category of aerial views as described herein. It is to be understood and appreciated, one or more image data sources 401-406 provide image data related to the insured property 300 to be aggregated by insurance server 106 as discussed further below.

With regards to external computing devices 410, each is preferably associated with a service provider relating to a user's insured property. For instance, they may include (but are not limited to) emergency responders (e.g., police, fire, medical, alarm monitoring services, etc.), utility companies (e.g., power, cable (phone, internet, television), water), service providers (e.g., home appliance providers), information/news providers (e.g., weather reports and other news items) and other like service/information/data providers.

With continuing reference to FIG. 4, in an illustrated embodiment, an insurance company's CRM module 404, coupled to insurance server 106, may be operative to enable the insurance company to understand a policyholder better. For instance, the CRM tool 404 may be operative to determine if the policyholder has a homeowner's policy, a checking account, a life insurance policy and an investment device. If this policyholder has multiple lines of business with the insurance company, the data analysis module 304 may determine the loss performance to be lower than another policyholder with a homeowner's policy only. Additionally, the CRM module 404 may be operative to determine the payment history for the policyholder. This information may be used to determine the policyholder's payment history as a data layer for making rating, acceptability, and/or coverage decisions, among others.

Figure 5:
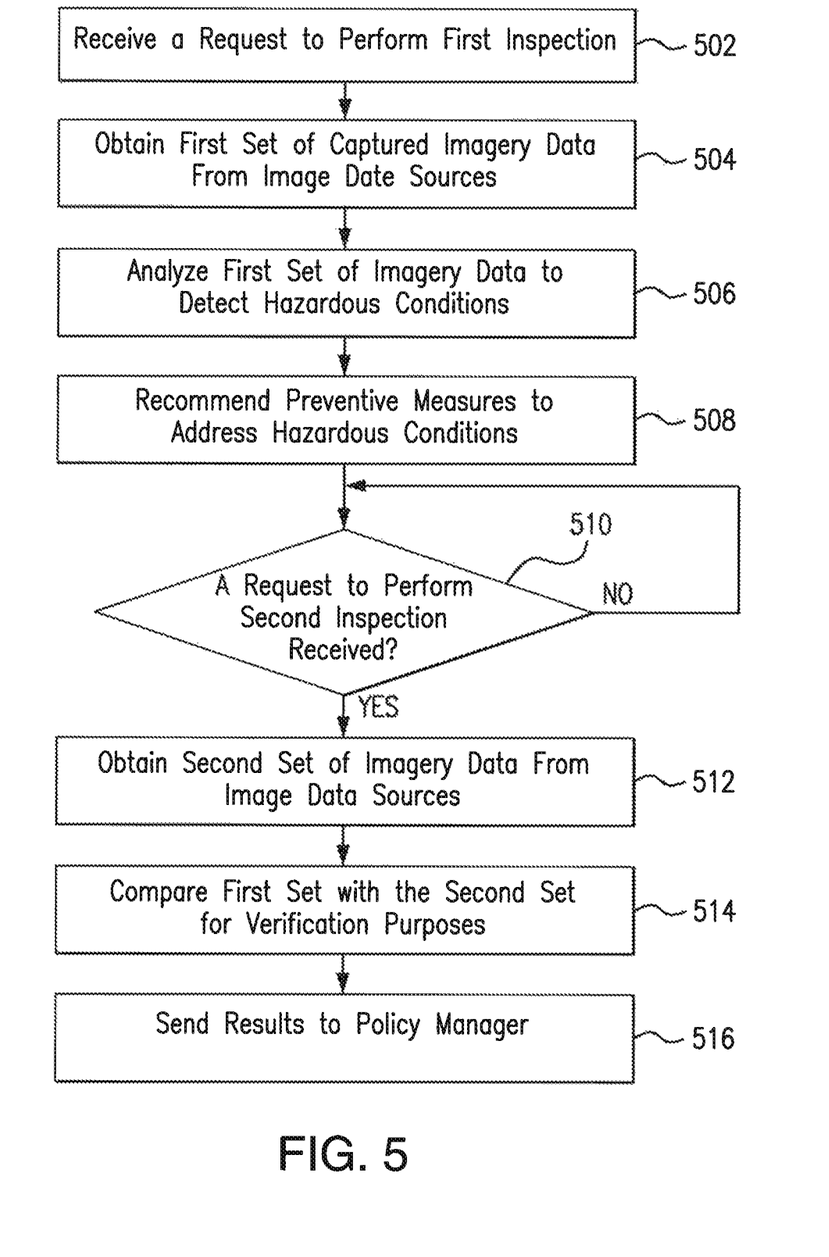
FIG. 5 is a flow diagram of operational steps of the imagery data analyzer module of FIG. 3 in accordance with an illustrated embodiment.

FIG. 5 shows, in the form of a flow chart, exemplary operational steps of the policy manager 306. Before turning to descriptions of FIG. 5, it is noted that the flow diagram shown therein is described, by way of example, with reference to components shown in FIGS. 1-4, although these operational steps may be carried out in any system and are not limited to the scenario shown in the aforementioned figures. Additionally, the flow diagram in FIG. 5 shows examples in which operational steps are carried out in a particular order, as indicated by the lines connecting the blocks, but the various steps shown in these diagrams can be performed in any order, or in any combination or sub-combination.

Generally, property insurance is associated with complex rating, underwriting and insurance-to-value processes, which typically require substantial data gathering activities. One type of coverage offered in property insurance is to insure the property against damage. When an event occurs that requires a property damage claim to be filed, the damage must be assessed to make a determination of how much to compensate the policyholder so the damage can be repaired. According to various embodiments of the present invention, in addition to data gathering and aggregation, policy manager 306 is preferably configured to facilitate a variety of property insurance related processes based upon the aggregated data. These processes include, but are not limited to, underwriting, rebuild cost estimation, providing a quote for an insurance policy, issuance and renewal of an insurance policy, validation of an insurance claim, and the like.

One problem in current insurance operations is the failure to identify situations, in advance, that may result in losses for the policyholder as well as the insurance company. Currently, property is inspected (both inside and outside) prior to policy renewal time (one or more years apart) or when creating a new account or after a claim has been filed. For some properties, such as basic office buildings where the business activities are deemed low risk, an inspection is not performed after the initial inspection when the account is created. This infrequent inspection rate is due in part to the cost and/or resources required to perform inspections and the desire not to inconvenience the customer. Accordingly, the time between inspections can be significant, allowing many potential hazards or risks to develop or accumulate over time without the knowledge of the insurance company or possibly even the policyholder. Also, the policyholder may not realize or appreciate the danger of such risks.

According to various embodiments of the present invention, in addition to gathering and aggregation of imagery data, imagery data analyzer 308 is preferably configured to utilize image informatics to detect hazardous conditions, evaluate corresponding risks, recommend preventive measures to address detected hazardous conditions and verify that recommended preventive measures were taken.

With reference to FIG. 5, at 502, imagery data analyzer 308 may receive a request, for example from the policy manager 306, to perform automatic virtual inspection of insured property 300. In an embodiment of the present invention, policy manager 306 may be configured to request such inspection periodically and/or in response to one or more triggering events. For example, policy manager 306 may request an inspection of the insured property 300 when specific predetermined weather conditions (i.e., forecasted drought conditions, high winds, snow and other inclement weather conditions) necessitate implementation of the corresponding protection measures in order to prevent and/or reduce damage to the insured property 300. It should be appreciated that in some embodiments imagery data analyzer 308 may be integrated with other sub-modules within the data analysis module 304, as well as other modules (not shown in FIG. 3), such as a user interface module, that may comprise or may otherwise make use of the insurance server 106. Accordingly, users, such as licensed insurance agents/underwriters, may also interact with imagery data analyzer 308 and may have an ability to request an on demand virtual inspection of insured property 300 via such user interface module or via a website hosted by or otherwise maintained by the insurance company. At 504, in response to receiving the virtual inspection request, imagery data analyzer 308 may send an image capture request to one or image data sources, such as satellite 401, drone 405, cameras 406 at one or more strategic locations on the property or roof, etc., to obtain one or more images 408 of the insured property 300. It is noted that according to an embodiment of the present invention one or more views of the insured property 300 may be captured in real time. The captured views may include, but are not limited to, elevation view, aerial view and facade view of the insured property 300. It is noted that in some embodiments surveying instruments may have a capability of performing internal inspections of the insured property 300. For example, in some embodiments, inspection cameras 406 and/or other imaging sensors 102 may be mounted in the ceiling, or on the walls of the insured property 300 and may have the ability to controllably rotate about one or more axes to view down the halls and/or into rooms. Internal and external inspections may also be performed as part of a damage claim inspection discussed herein.

According to an embodiment, step 504 includes taking the aerial imagery from images 408 and using the imagery for gathering useful insurance information about the insured property 300. For example, and for explanatory purpose only, image data sources 401-406 can take high resolution photos of the insured property 300. Imagery data might include details about components, structure and other attributes of the insured property 300, such as, but not limited to, roof, windows, light fixtures and/or other objects and features inside the insured property 300, or it might include details about specific vegetation (e.g., type, location, height, shape, proximity to the property, angle of protrusion from the ground, etc.), snow conditions, and/or other outdoor objects or conditions. Algorithms can render those images into 3D models of the property, use object recognition software to identify exterior construction, roof type, number of windows, and other features of the insured property 300. In some embodiments, the data received by imagery data analyzer 308 may include environmental and weather-related information related to insured property 300 and captured by various sensors 102 described herein and/or aerial image sources, such as satellite system 401. It is noted that imagery data obtained at 504 may also be utilized by the policy manager 306, for example, to identify the amount of insurance needed or the estimated market value of the property.

According to another embodiment, one or more image data sources, such as cameras 406 and/or other image sensors 102 may operate in multiple power saving modes. In some embodiments, multiple sleep and awake modes (power saving modes) may be utilized to increase life of the power source of these image sources. Switching from a full run mode through a succession of reduced power modes may be achieved through specific instructions received from imagery data analyzer 308. For instance, at step 502, prior to sending the image capture request, imagery data analyzer 308 may issue a wake-up call to one or more device imagery data sources operating in a low-power (sleep) mode.

In some alternative embodiments, automatic virtual inspection of insured property 300 may be initiated by computing device 103 located within the structure of insured property 300 and operatively coupled with sensors 102 described above. In other words, based upon analysis of certain sensor data, the computing device 103 may issue a wake-up call and an image capture request to one or more imagery data sources operating in a low-power (sleep). In response, one or more imagery data sources 401-406 may capture and transmit first set of imagery data to imagery data analyzer 308.

At 506, imagery data analyzer 308 may analyze first set of imagery data as well as environmental and weather-related information collected at 504 to identify risk characteristics, such as hazardous conditions related to the insured property 300. For instance, based on images 408, imagery data analyzer 308 may determine a type of vegetation and its proximity to the insured property 300. When a tree touches the roof of the property it can cause the roof to wear out quicker. Accordingly, a tree touching the roof of the insured property 300 may be identified by imagery data analyzer 308 as a condition requiring some preventative measures. Non-limiting examples of hazardous conditions that may be detected by imagery data analyzer 308 at the insured property 300 include improper storage of flammable materials, missing stair railings, poorly maintained driveway, presence of unfenced and uncovered swimming pool near the insured property 300, and the like.

At 508, imagery data analyzer 308 may identify preventive and mitigative measures to contain or curtail detected hazardous conditions and other risk characteristics. Such preventive measures corresponding to conditions identified at 506 may include, for example, removal of brush, overhanging trees and/or other flammable materials from within a predetermined vicinity of the insured property 300, stair repair services, improved driveway maintenance, fencing the pool, and the like. In one embodiment, imagery data analyzer 308 and/or policy manager 306 may send a notification to a policyholder associated with the policy covering insured property 300. Such notification may indicate recommended preventive and mitigative measures. If certain hazardous conditions are identified as high risk characteristics, the notification sent at 508 may also indicate a corresponding period of time within which the preventive/mitigative measures should be taken depending on the identified risks and contingent upon current environmental conditions.

The characteristics identified of the dwelling can be automatically assessed by the either policy manager 306 or computing device 103 for determining pricing, acceptability, underwriting and claim processing and policy renewal, among other property insurance related decisions. For example, a homeowner may apply for a new insurance policy with a home with a hole in the roof over 3 inches. This hole could be identified by the aerial photos, the underwriting criteria could be not to insure any home with a hole in the roof over 2 inches, and then the insurance could be declined.

With reference back to FIG. 5, at 510, the imagery data analyzer 308 may periodically check whether either policy manager 306 or computing device 103 sent a subsequent request to perform another automatic virtual inspection of insured property 300, referred to hereinafter as a second virtual inspection. In one embodiment, the policy manager 306 may send such request upon expiration of prescribed time period. In another embodiment, the computing device 103 may request the second virtual inspection as a result of deteriorating weather conditions, such as imminent drought conditions.

In response to receiving the second virtual inspection request (step 510, yes branch), at 512, imagery data analyzer 308 may send another image capture request to one or more surveying instruments, such as satellite 401, drone 405, cameras 406 to obtain a second set of images 408 of the insured property 300. The captured second set of imagery data may include, but is not limited to, elevation views, aerial views, facade and/or internal views of the insured property 300. Second set of imagery data is preferably closely related to identified hazardous conditions at the insured property 300. In some embodiments, imagery data analyzer 308 may be configured to have a remote control capability of one or more imagery data sources 401-406. For instance, if cameras 406 have the ability to controllably rotate about one or more axes, imagery data analyzer 308 may strategically adjust their positions/angles so that the areas of interest (i.e., swimming pool, roof, driveway, etc.) are covered by cameras 406.

Next, at 514, imagery data analyzer 308 may advantageously compare the first set of imagery data (captured at 504) with the second set of imagery data (captured at 512) in order to verify that preventive/mitigative measures have been taken. As a non-limiting example, at 514, if the second inspection request was received as a result of imminent drought conditions imagery data analyzer 308 may determine whether improper storage of flammable materials has been rectified. In another example, if the second virtual inspection is performed after a catastrophic event either damaged or destroyed the insured property 300, the second set of imagery data may enable imagery data analyzer 308 to detect usage of certain preventative tools/components (e.g., hurricane shields) prior to occurred insurance-related event. This type of determination advantageously facilitates more accurate assessment of liabilities, policyholder's compliance with the prescribed preventive/mitigative measures, and the like. At least in some embodiments, at 514, imagery data analyzer 308 may utilize metadata (i.e. a time when the image was captured and additional information associated with the image capture) associated with the first and second sets of imagery data for image comparison purposes.

In one embodiment of the present invention, at 516, imagery data analyzer 308 may transmit results of comparison performed at 514 and/or second set of imagery data to policy manager 306. This analyzed imagery data can add to the information known about the policyholder and the insured property 300 and can be useful to policy manager 306 for determining pricing, acceptability, underwriting, and claim processing and policy renewal, among other property insurance related decisions. For instance, policy manager 306 may adjust terms of an insurance policy associated with the insured property 300 based on the analyzed imagery data. As another example, the policy manager 306 may utilize imagery data for claim confirmation purposes.

In summary, various embodiments disclosed herein can increase the quality, speed, and efficiency and reduce the cost of insured property inspections acquiescent to automated processing and detailed comparison. By using a plurality of image sources 401-406 determination of policyholder's compliance with recommended remedial measures and virtual inspections can be performed more safely, more quickly, and more accurately. In addition, verification of remedial measures can be performed on parts of a property that in the past might not have been inspected because of the danger of the situation.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features.

The foregoing description should therefore be considered as merely illustrative of the principles, teachings and exemplary embodiments of this invention, and not in limitation thereof.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer implemented method performed by a computer system, the method comprising:
   detecting, by the computer system, a pre-determined weather condition at a property;
   responsive to detecting the pre-determined weather condition at the property, transmitting a request to one or more image data sources to switch from a low-power mode to an awake mode, wherein the one or more images data sources comprise at least one of a camera or an imaging sensor located at the property;
   transmitting, by the computer system, an image capture request to the one or more image data sources;
   receiving, by the computer system, a set of image data from the one or more image data sources;
   generating, by the computer system, a three-dimensional (3D) model of the property based on the set of image data;
   performing, by the computer system, a computerized object recognition analysis of the 3D model;
   identifying, by the computer system, one or more risk conditions on the property based on the computerized object recognition analysis of the 3D model; and
   providing, by the computer system to a user associated with the property, a notification indicating one or more preventive measures to address the one or more risk conditions.

2. The computer implemented method of claim 1, wherein the one or more image data sources comprise a drone having one or more cameras.

3. The computer implemented method of claim 2, wherein the set of image data comprises one or more aerial images obtained by the one or more cameras of the drone.

4. The computer implemented method of claim 1, wherein the awake mode is a full power mode.

5. The computer implemented method of claim 1, wherein the pre-determined weather condition comprises at least one of a drought condition, wind, or snow.

6. The computer implemented method of claim 5, wherein the one or more risk conditions comprises a fire risk.

7. The computer implemented method of claim 6, wherein the one or more preventive measures comprises removing flammable materials from a vicinity of the property.

8. The computer implemented method of claim 5, wherein the one or more risk conditions comprises vegetation in proximity to the property.

9. The computer implemented method of claim 8, wherein the one or more preventive measures comprises removing the vegetation.

10. The computer implemented method of claim 5, wherein the one or more risk conditions comprises a deficiency in maintenance of a driveway of the property.

11. The computer implemented method of claim 10, wherein the one or more preventive measures comprises improving the maintenance of the driveway of the property.

12. One or more computer-readable storage devices coupled to one or more processors and having a plurality of program instructions stored thereon which, when executed by one or more processors, cause the one or more processors to perform operations comprising:
   detecting a pre-determined weather condition at a property;
   responsive to detecting the pre-determined weather condition, transmitting a request to one or more image data sources to switch from a low-power mode to an awake mode, wherein the one or more images data sources comprise at least one of a camera or an imaging sensor located at the property;
   transmitting an image capture request to the one or more image data sources;
   receiving a set of image data from the one or more image data sources;
   generating a three-dimensional (3D) model of the property based on the set of image data;
   performing, by a computerized object recognition analysis of the 3D model;
   identifying one or more risk conditions on the property based on the computerized object recognition analysis of the 3D model; and
   providing, to a user associated with the property, a notification indicating one or more preventive measures to address the one or more risk conditions.

13. The one or more computer-readable storage devices of claim 12, wherein the one or more image data sources comprise a drone having one or more cameras.

14. The one or more computer-readable storage devices of claim 13, wherein the set of image data comprises one or more aerial images obtained by the one or more cameras of the drone.

15. The one or more computer-readable storage devices of claim 12, wherein the awake mode is a full power mode.

16. The one or more computer-readable storage devices of claim 12, wherein the pre-determined weather condition comprises at least one of a drought condition, wind, or snow.

17. The one or more computer-readable storage devices of claim 16, wherein the one or more risk conditions comprises a fire risk.

18. The one or more computer-readable storage devices of claim 16, wherein the one or more risk conditions comprises vegetation in proximity to the property.

19. The one or more computer-readable storage devices of claim 16, wherein the one or more risk conditions comprises a deficiency in maintenance of a driveway of the property.

20. A computer system comprising:
   one or more processors, and
   one or more computer-readable storage devices coupled to the one or more processors and having instructions stored thereon which, when executed by the one or more processors, cause the one or more processors to perform operations comprising:
   detecting a pre-determined weather condition at a property;
   responsive to detecting the pre-determined whether condition at the property, transmitting a request to one or more image data sources to switch from a low-power mode to an awake mode, wherein the one or more images data sources comprise at least one of a camera or an imaging sensor located at the property;
   transmitting an image capture request to the one or more image data sources;
   receiving a set of image data from the one or more image data sources;
   generating a three-dimensional (3D) model of the property based on the set of image data;
   performing a computerized object recognition analysis of the 3D model;
   identifying one or more risk conditions on the property based on the computerized object recognition analysis of the 3D model; and
   providing, to a user associated with the property, a notification indicating one or more preventive measures to address the one or more risk conditions.

\* \* \* \* \*

UNITED STATES PATENT AND TRADEMARK OFFICE
CERTIFICATE OF CORRECTION

| | | |
|---|---|---|
| PATENT NO. | : 11,900,470 B1 | Page 1 of 1 |
| APPLICATION NO. | : 17/196437 | |
| DATED | : February 13, 2024 | |
| INVENTOR(S) | : Ramsey Devereaux et al. | |

It is certified that error appears in the above-identified patent and that said Letters Patent is hereby corrected as shown below:

On the Title Page

References Cited, Column 2 (Item (56) Other Publications), Line 1, delete "Valapi" and insert -- Valapil --.

In the Claims

Column 20, Line 32, Claim 20, delete "whether" and insert -- weather --.

Signed and Sealed this
Tenth Day of December, 2024

Katherine Kelly Vidal
*Director of the United States Patent and Trademark Office*